J. LAPP.
METHOD AND MACHINE FOR FORMING IMPRESSIONS IN PLASTIC ARTICLES.
APPLICATION FILED SEPT. 15, 1919.
1,407,550.
Patented Feb. 21, 1922.
3 SHEETS—SHEET 1.
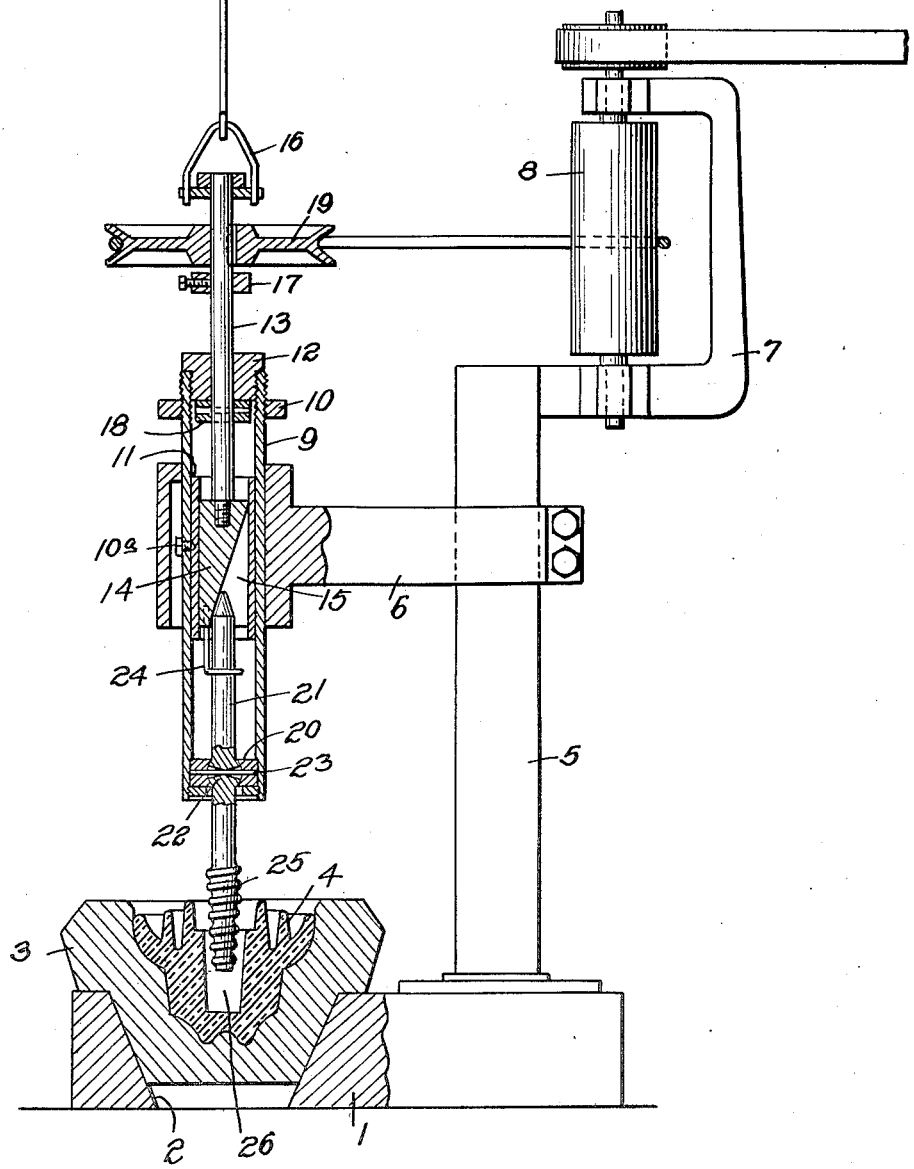

J. LAPP.
METHOD AND MACHINE FOR FORMING IMPRESSIONS IN PLASTIC ARTICLES.
APPLICATION FILED SEPT. 15, 1919.
1,407,550.
Patented Feb. 21, 1922.
3 SHEETS—SHEET 2.
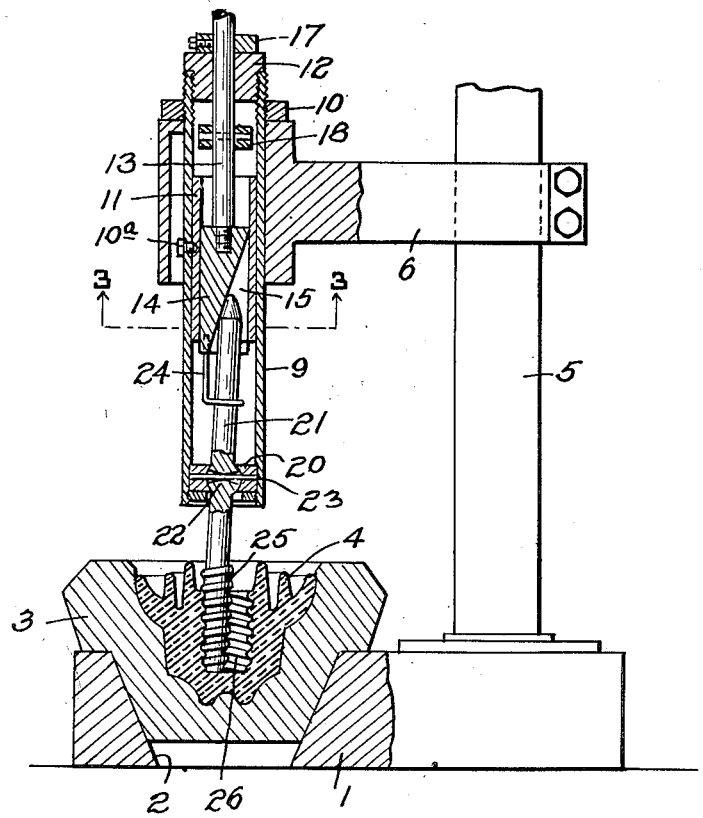
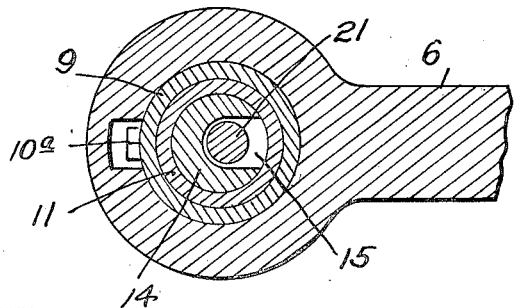

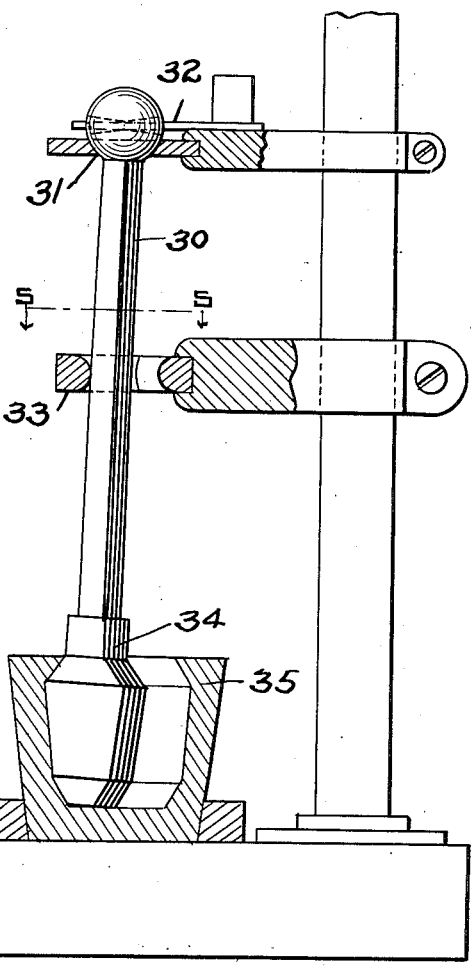
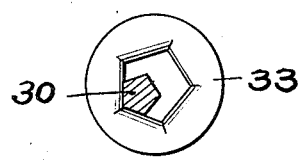

UNITED STATES PATENT OFFICE.

JOHN LAPP, OF ROCHESTER, NEW YORK.

METHOD AND MACHINE FOR FORMING IMPRESSIONS IN PLASTIC ARTICLES.

1,407,550. Specification of Letters Patent. Patented Feb. 21, 1922.

Application filed September 15, 1919. Serial No. 323,784.

*To all whom it may concern:*

Be it known that I, JOHN LAPP, a citizen of the United States, and a resident of Rochester, in the county of Monroe and State of New York, have made a new and useful Invention in Method and Machine for Forming Impressions in Plastic Articles, of which the following is a specification.

My invention relates to the manufacture of articles of plastic or impressionable material and consists of a method, and means for following same, adapted to form impressions either threaded or otherwise spiral, cylindrical, conical or polygonal. I revolve, or gyrate, and guide a forming tool about the axis of the impressioned part of the article, vary the radius of the tool's movement and, preferably, prevent any rotation of the tool on its own axis. When the impression is completed, I resume the original radius of the tool's movement until the tool and the work may be separated without injury to the impressioned surface.

In the accompanying drawings I have illustrated the application of my method to the internal shaping of a clay article which is shaped in the machine described before the clay is hardened by drying or firing. Figure 1 is a vertical view and section as the impressioning tool is being lowered into operating position; Fig. 2 is a similar section but showing the tool when making the final impression; Fig. 3 is a horizontal section on line 3—3 of Fig. 2; Fig. 4 is a vertical section of a modified machine especially adapted to produce polygonal or irregularly curved impressions and Fig. 5 is a horizontal section on line 5—5 of Fig. 4.

Briefly, the preferred machine comprises a holder for the article, a threading tool mounted above the holder and driving means adapted to gyrate and guide the tool about the axis of the surface to be impressed. The tool may be raised or lowered and gyrated and the radius of its gyration may be varied.

The base 1 of the machine is provided with a tapered pocket 2 for a mold 3 holding an insulator 4 which is in the process of being manufactured and is still plastic. Mold 3 is freely removable from the base and other molds for other types and sizes of insulators may be substituted therefore.

Mounted on base 1 is a standard 5 which supports a clamped arm 6 and a bearing support 7 for pulley 8. The projecting part of arm 6 is enlarged and provided with a vertical cylindrical hole in which a sleeve 9 has a sliding fit. A collar 10 screwed to the upper end of sleeve 9 is adapted to engage arm 6 and forms an adjustable stop for the descent of sleeve 9.

Fixed in sleeve 9 by a set screw 10$^a$ is a bushing 11. A vertical slot in arm 6 permits screw 10$^a$ and sleeve 9 to move up and down but prevents rotation of same. In the upper end of sleeve 9 is a plug 12 which, with bushing 11, forms journal bearings for a driver comprising a shaft 13 and a plug 14 united by threads or otherwise.

Plug 14 is cylindrical and is provided with a slot 15 the bottom of which crosses the axis of the plug diagonally. The upper end of shaft 13 is shouldered and is there supported by an overhead hanger 16 by which it is raised and lowered in any suitable manner. A collar 17 provides an adjustable stop for limiting the descent of the driver relative to sleeve 9 and a pinned collar 18 provides means for raising the sleeve and preventing plug 14 from being withdrawn from bushing 11. Driver 13 receives its motion through a pulley 19 and a belt to pulley 8.

Secured in the lower end of sleeve 9 is a split socket member 20 and supported therein is a stem 21 having a ball portion 22. The ball and socket bearing allows stem 21 angular freedom of its axis with respect to the axis of sleeve 9 but there can be no relative longitudinal movement between the two members. A pin 23 through socket 20 and ball 22 prevents rotation of stem 21. As shown in the drawings, the way formed in the ball 22 through which the pin projects is so formed that it does not prevent the oscillatory or gyrating motion of the stem 21. The upper end of stem 21 enters slot 15 in plug 14 and a spring 24 maintains the top of stem 21 in contact with the bottom of slot 15.

On the lower end of stem 21 is mounted a threading tool 25. This tool is threaded with the same pitch that it is desired to produce in the insulator threads but the outside diameter of its threads is less than the inside diameter of the threads to be formed in the insulator.

Operation: After the various stops have been properly adjusted, the driver is rotated continuously. Fig. 1 shows sleeve 9 with the driver and tool stem being lowered to insert tool 25 into the hole 26 in the insulator. It is to be understood that hole 26 is moulded or otherwise formed in the insulator before the present operation is reached.

With the vertical position of plug 14 as shown, stem 21 is not deflected from the perpendicular and tool 25 does not contact with the sides of the insulator hole. After collar 10 is seated upon arm 6, downward movement of sleeve 9 and stem 21 is arrested and further descent of the driver results in lateral deflection of the upper end of stem 21. Of course the lower end is also deflected proportionally in the opposite direction.

As plug 14 rotates in bushing 11 the center of the top of stem 21 revolves in a circle whose diameter will increase as the plug is lowered. The action of the threading tool on the plastic surface is analogous to a series of impressions or a wiping action. As plug 14 is lowered the impressions made by tool 25 will deepen until the thread surface in the clay is completed as indicated in Fig. 2 when collar 17 prevents further descent of the driver and further deflection of tool 25.

When the threading is completed the driver is lifted which centers the tool so that in its withdrawal it does not touch and destroy the threads just formed. As the driver is lifted further, collar 18 engages plug 12 which raises sleeve 9 and the threading tool is withdrawn from the insulator.

It is customary at present to form threads in insulators by means of a plunger which is rotated and the thread formed by a spiral or screwing in movement of a threading tool which has an outside thread corresponding to the inside thread produced in the insulator. At the end of the feeding in, the plunger must be reversed and the tool screwed out. The necessary complications to provide a reversing mechanism will be appreciated, also the difference in original and operating costs. The forming surfaces of such plungers must be vented for the escape of confined air and when these vented surfaces come in contact with the clay a portion of the clay is extruded through the vent and as the plunger is rotating there is a drawing effect on the adjacent clay which tends to develop a structure striated in the direction in which the plunger is rotating. When the plunger is reversed the direction of draw of the extruded clay is also reversed and the effect at the point of reversal is to start a crack which develops during the subsequent steps in the manufacture of the insulator and affects the insulating properties adversely. By eliminating the necessity of reversal I eliminate the potential cause of such defects.

In order to produce a straight thread in the insulator it is necessary to taper the threads on tool 25 from top to bottom so that when the tool axis is inclined to its maximum position, the plane of the thread tops will be perpendicular. If it is desired to produce a tapered thread on the insulator the threads on the tool will be tapered accordingly. This statement is based upon the pivotal mounting of stem 21 but it is obvious that my machine may be constructed to provide a non-pivotal, lateral movement of tool 25 without departing from the principle of its operation.

While I have illustrated my device as applied to the process of forming threads on the interior walls of an insulator I contemplate its use externally as well, and, not only for threading, but for forming other grooves or impressions which are recessed in such a way that it would be difficult or impossible to withdraw the forming tool from a mold if the impression were made in the usual commercial manner. If parallel grooves, or other impressions having a constant cross section, are to be formed the means I employ for securing the tool against rotation on its axis may be dispensed with.

I have not indicated the direction in which the driver is rotated as the machine will produce similar threads whether the tool be driven to the right or to the left which I believe to be a novel feature in the production of threads. I have discovered that the wiping action of the forming tool 25 has a tendency to feed the material in the direction of the successive contacting points on the tool surface. Thus if a right hand thread on the tool is gyrated in a left hand direction, this feeding tendency compacts the material at the bottom edge of hole 26 which is an advantage because it obviates the development of cracks at this point which sometimes develop when the tool is gyrated in the opposite direction so as to feed the material from the bottom of the recess upwardly.

In the above described machine, the forming tool guide and driving means are united in plug 14. Figs. 4 and 5 illustrate a modified machine in which the guide and drive are separated. I have not shown any driving means but same may be the hand of an operator or a mechanism adapted for the shape being produced.

A tool stem 30 is supported by an universal joint 31 and prevented from rotating by pin 32. The recess in which the pin is located is tapered as shown in the drawings so as not to hamper the relative movement between the pin and tool. The lateral movements of stem 30 are limited by guide 33 having the internal outline shown in Fig. 5. A forming tool 34 on the lower end of stem 30 is adapted, in this instance, to form a recess in the article 35 which is pentagonal in cross section with a re-entrant or overhanging edge or flange around the inlet or open

I claim:—

1. A method of forming impressions in plastic articles which consists in gyrating a forming tool about the axis of the surface to be impressed but without rotation about its own axis and gradually varying the radius of the tool's gyration.

2. A method of forming impressions in a surface which consists in positioning a forming tool adjacent said surface, in gyrating said tool with increasing radii but without rotation about its axis until said tool impresses said surface, decreasing the radii of gyration of said tool until said tool does not overlap any portion of said surface and then withdrawing said tool and said surface from each other.

3. A method of forming cylindrical impressions in plastic articles which consists in gyrating a tool about a fixed axis and preventing rotation of said tool about its own axis, said tool having an outline corresponding to the outline of the desired impression, and moving said tool while gyrating, transversely of said fixed axis and into contact with the surface to be impressed.

4. A method of forming impressions in plastic articles consisting in gyrating a tool in contact with the surface to be impressed and around the axis of said surface and preventing any rotation of said tool about its own axis.

5. A method of forming threads in a plastic article characterized by lateral and circular movements of a forming tool relative to the article and by absence of longitudinal movement of the tool relative to the article.

6. The method of forming threads in an article with a threaded tool, characterized by the absence of relative axial rotation of said article and said tool.

7. A method of forming threads in a plastic article by gyrating a threaded tool about said article in a direction opposite to the lead of the thread on the tool and the thread which is produced in said article.

8. A method of forming right hand threads in a palstic article by gyrating a threaded tool about said article in a left hand direction.

9. A method of forming impressions in plastic articles which consists in revolving a forming tool about the axis of the surface to be impressed, preventing rotation of said tool about its own axis and gradually increasing the radius of the tool revolution.

10. In a machine for forming impressions in plastic articles, a tool pivotally suspended from a point in a fixed, vertical axis and means for gyrating said tool about said axis and for moving said tool transversely of said axis.

11. In a machine for forming impressions in plastic articles, a forming tool, means for gyrating said tool about its axis but without rotation thereon, and means for increasing and decreasing the radius of the tool's gyration.

12. In a machine for forming threads on an article, a threaded tool, means for contacting said tool with the surface of the article to be threaded and mechanism for gyrating said tool about the axis of said surface without rotation upon the axis of said tool.

13. In a machine for forming right hand threads on the surface of an article, a tool having right hand threads thereon and means for moving said tool around the article surface in a left hand direction and in contact therewith and without rotation on the tool axis.

14. In a machine for forming impressions on plastic articles, a vertically sliding sleeve, an impressioning tool mounted therein so as to permit pivotal movement of said tool laterally of said sleeve and means for gyrating said tool about the axis of said sleeve and for controlling the amount of said movement.

15. In a machine for forming impressions in plastic articles, a sleeve having its axis alined with the axis of the impression desired, a stem provided midway its ends with a pivotal support on said sleeve, an impression forming tool mounted at one end of said stem, and a rotating plug journaled in said sleeve and adapted to gyrate the opposite end of said stem about said axes, thereby gyrating said tool about the axis of the surface to be impressed.

16. In a machine for forming threads on the surface of an article, a tool provided with threads leading in one direction, mechanism for gyrating said tool about the article surface in a direction opposite to the leads of said threads without rotating said tool on its axis, and means for varying the radius of gyration of said tool.

17. In a machine for forming an impression in a plastic article, a vertical sleeve, a rotating plug therein, an impression forming tool mounted on a stem normally alined with said plug and supported by said sleeve through an universal joint at a point spaced from said tool, said stem having an end spaced from said tool and from said joint and extending into a longitudinal slot in said plug, said slot extending diagonally across the plug axis, and means for raising and lowering said plug independently of said sleeve, and means for maintaining contact of said end and the bottom of said slot.

18. In a machine for forming an impression in a plastic article, a vertical sleeve, a rotating plug therein, an impression forming tool mounted on a stem normally alined with said plug and supported by said sleeve through an universal joint at a point spaced from said tool, said stem having an end spaced from said joint and from said tool and extending into a longitudinal slot in said plug, said slot extending diagonally across the plug axis, means for raising and lowering said plug independently of said sleeve, means for maintaining contact of said end and the bottom of said slot and means for preventing rotation of said tool about the axis of said stem.

19. In a machine for forming impressions in plastic articles, a sleeve having its axis alined with the axis of the impression desired, a stem provided between its ends with a pivotal support on said sleeve, an impression forming tool mounted at one end of said stem, a rotating plug journaled in said sleeve, and a slot in said plug in a plane containing the plug axis and with its bottom crossing the plug axis diagonally, said slot being adapted to receive and engage the opposite end of said stem, and means for raising and lowering said plug while rotating, whereby successive points in said bottom engage said opposite end and move it transversely the axis of said sleeve and thereby move said tool transversely the axis of the surface to be impressed, and whereby the sides of said slot gyrate said opposite end about the axis of said surface and thereby gyrate said tool about said surface.

20. In a machine for forming impressions on plastic articles, an impressioning tool mounted so as to have pivotal movement about a fixed axis and means for gyrating said tool about said axis and for controlling the amount of said pivotal movement.

21. In a machine for forming an impression on the surface of a plastic article, a holder for the article to be impressed, an impressioning tool pivotally mounted on a point in the axis of said surface and means for gyrating said tool about said axis and for moving said tool transversely of its pivotal point.

22. A method of forming impressions in a surface which consists in positioning a forming tool adjacent said surface, in gyrating said tool with varying radii, but without rotation upon its axis, until said tool impresses said surface, resuming the original radius of gyration of said tool until said tool does not overlap any portion of said surface and then withdrawing said tool and said surface from each other.

23. A method of molding plastic material which consists in locating the plastic material to be molded in a stationary mold open at one end for the reception of a molding tool, introducing the molding tool through the opening into the mold and moving it in a substantially circular path while gradually increasing the radius of its path of motion.

24. A method of molding plastic material which consists in locating the plastic material to be molded in a stationary mold open at one end for the reception of a molding tool, introducing the molding tool into the mold and gyrating the tool without turning it on its axis and while gradually increasing the radius of its gyration.

In testimony whereof, I have hereunto subscribed my hand this 2 day of September, 1919.

JOHN LAPP.